United States Patent
Fukuda et al.

(10) Patent No.: US 6,351,331 B1
(45) Date of Patent: Feb. 26, 2002

(54) FARADAY ROTATOR AND MAGNETO-OPTICAL ELEMENT USING THE SAME

(75) Inventors: Satoru Fukuda; Masayuki Tanno; Toshiaki Watanabe; Toshihiko Ryuo, all of Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/580,242

(22) Filed: May 26, 2000

(30) Foreign Application Priority Data

May 28, 1999 (JP) .......................................... 11-150127

(51) Int. Cl.$^7$ .......................... G02F 1/00; C01F 17/00; C30B 29/16
(52) U.S. Cl. ...................... 359/324; 359/280; 423/263; 117/942
(58) Field of Search ................................. 359/280–283, 359/324, 301, 258, 345, 484, 494, 501; 252/582–585; 423/263; 117/942

(56) References Cited

U.S. PATENT DOCUMENTS

| | | | |
|---|---|---|---|
| 3,811,096 A | 5/1974 | Dillon, Jr. et al. | 359/283 |
| 4,295,988 A | 10/1981 | Nelson et al. | 252/584 |
| 4,896,103 A | 1/1990 | Shimanuki et al. | 324/96 |
| 4,932,760 A | 6/1990 | Arii et al. | 359/281 |
| 5,186,866 A | 2/1993 | Ryuo et al. | 252/584 |
| 5,277,845 A | 1/1994 | Ryuo et al. | 252/584 |
| 5,547,613 A | 8/1996 | Kawai et al. | 252/584 |
| 5,565,131 A | 10/1996 | Shirai et al. | 252/62.56 |
| 5,640,516 A | 6/1997 | Iwatsuka et al. | 359/280 |
| 5,866,092 A | 2/1999 | Fukuda et al. | 423/263 |

FOREIGN PATENT DOCUMENTS

| | | | |
|---|---|---|---|
| EP | 1 055 957 A2 | 11/2000 | |
| JP | 63-69800 | 3/1988 | |
| JP | 1-257917 | 10/1989 | 252/584 |
| JP | 2679157 | 8/1997 | |
| JP | 2839042 | 10/1998 | |
| JP | 2924282 | 5/1999 | |

OTHER PUBLICATIONS

"Magneto–Optical Properties of $(TbBi)_3Fe_5O_{12}$ and its application to a 1.5$\mu$m wideband optical isolator", T. Tamaki et al., J. Appl. Phys. vol. 70, No. 8, Oct. 15, 1991.

Primary Examiner—Georgia Epps
Assistant Examiner—Evelyn A. Lester
(74) Attorney, Agent, or Firm—Reed Smith LLP

(57) ABSTRACT

A Faraday rotator whose Faraday's rotational angle has low temperature-dependency; a method for efficiently preparing the same; a magneto-optical element which makes use of the Faraday rotator and whose characteristic properties are not susceptive to temperature changes; and an optical isolator, which can be provided at a low price. A Faraday rotator consists of a garnet crystal represented by the following compositional formula and having a lattice constant of 12.470 ±0.013 Å:

$$(Tb_{1-(a+b+c)}Ln_aBi_bM1_c)_3(Fe_{1-d}M2_d)_5O_{12}$$

in the formula, Ln is an element selected from the group consisting of rare earth elements other than Tb; M1 represents an element selected from the group consisting of Ca, Mg and Sr; M2 is an element selected from the group consisting of Al, Ti, Si and Ge; and a to d are numerals satisfying the following relations: $0 \leq a \leq 0.5$, $0 < b \leq 0.2$, $0 \leq c \leq 0.02$ and $0 \leq d \leq 0.1$.

9 Claims, 3 Drawing Sheets

FIG. 1 Temperature-Dependency of Faraday's Rotational Angle

FARADAY ROTATOR AND MAGNETO-OPTICAL ELEMENT USING THE SAME

BACKGROUND OF THE INVENTION

The present invention relates to a Faraday rotator and a method for preparing the same as well as a magneto-optical element in which the Faraday rotator is incorporated and an optical isolator as one of the magneto-optical elements.

In an optical circuit, which constitutes an optical communication system, there have been used a variety of magneto-optical elements such as an optical isolator, an optical circulator, an optical switch, a magnetic field sensor and an optical attenuator. Such a magneto-optical element comprises a Faraday rotator as an optical component and therefore, the operating ability of the magneto-optical element is changed due to the temperature of the environment in which the element is operated (hereunder referred to as "use environment"). For this reason, a temperature-control device is fitted to the magneto-optical element in the use environment whose temperature is severely changed, but the use of the control device is not necessary if the temperature-dependency of the Faraday's rotational angle of the Faraday rotator is low.

As to the improvement of the Faraday rotator in the temperature-dependency, Japanese Patent No. 2,679,157 discloses the use of a terbium-bismuth-gallium iron garnet crystal. This crystalline body is grown by the flux method and therefore, it suffers from a problem such as low reproducibility and productivity and difficulty in processing.

On the other hand, it has been tried to prepare a garnet-epitaxial film according to the liquid phase epitaxy, but the usually available garnet crystals are those obtained by replacing or substituting $Gd_3Ga_5O_{12}$ with Ca, Mg, Zr (an NOG substrate manufactured by Shin-Etsu Chemical Co., Ltd. and having a lattice constant of 12.496±0.003 Å) and $Sm_3Ga_5O_{12}$ (an SGG substrate having a lattice constant of 12.439 Å).

SUMMARY OF THE INVENTION

Accordingly, it is an object of the present invention to, in a broad sense, solve the foregoing problems associated with the conventional techniques and to, in a narrow sense, provide a Faraday rotator whose temperature-dependency in the Faraday's rotational angle is low, a method for efficiently preparing the same, a magneto-optical element, which makes use of the rotator and whose quality and characteristic properties are less sensitive to a temperature change in the use environment and an optical isolator, at a low price.

The inventors of this invention have variously investigated any change in the Faraday's rotational angle of the Faraday rotator due to temperature changes in the use environment, have found that the temperature-dependency of the Faraday's rotational angle is adversely affected by the chemical species of ions, which occupy the positions 24c in the garnet crystal structure constituting the Faraday rotator and have thus completed the present invention.

According to a first aspect of the present invention, there is provided a Faraday rotator, which consists of a garnet crystal represented by the following compositional formula and having a lattice constant of 12.470±0.013 Å:

$$(Tb_{1-(a+b+c)}Ln_aBi_bM1_c)_3(Fe_{1-d}M2_d)_5O_{12} \quad \text{I}$$

In Formula I, Ln is an element selected from the group consisting of rare earth elements other than Tb; M1 represents an element selected from the group consisting of Ca, Mg and Sr; M2 is an element selected from the group consisting of Al, Ti, Si and Ge; and a to d are numerals satisfying the following relations: $0 \leq a \leq 0.5$, $0 < b \leq 0.2$, $0 \leq c \leq 0.02$ and $0 \leq d \leq 0.1$.

Among the foregoing Ln, preferred are, for instance, La, Pr, Nd, Gd, Dy, Ho, Yb, Lu and Tm. These elements have ionic radii different from one another and these elements can be incorporated into the crystal in an appropriate amount which falls within the range: $0 \leq a \leq 0.5$ so that the lattice constant thereof falls within the range: 12.470±0.013 Å. If the rate b of Bi present exceeds 0.2, the lattice constant of the resulting crystal is beyond the desired range defined above. The elements Ca, Mg and Sr represented by M1 have a light absorption-inhibitory effect to thus improve the optical transmission and it is sufficient to use these elements in a trace amount (rate c) on the order of not more than 0.02. The elements Al, Ti, Si and Ge represented by M2 are replaced with Fe atoms in the garnet crystal. The element Al is involved in the lattice constant and saturated magnetic flux density of the crystal. The elements Ti, Si and Ge serve to prevent light absorption like the elements Ca, Mg and Sr, when the coexisting Fe ions are in the divalent state. If the rate d of these elements exceeds 0.1, the lattice constant of the resulting crystal is beyond the desired range defined above and the saturated magnetic flux density would exceed 1000 gauss (Gs).

As specific examples of the garnet crystals represented by Formula I, preferred be one represented by the following compositional formula: $Tb_{2.48}Bi_{0.52}Fe_5O_{12}$.

According to a second aspect of the present invention, there is provided a method for preparing a Faraday rotator, which comprises the step of growing a garnet crystal represented by Formula I and having a lattice constant of 12.470±0.013 Å on a substituted or unsubstituted gadolinium-gallium-garnet crystalline substrate having a lattice constant of 12.472±0.013 Å according to the liquid phase epitaxy.

More specifically, the method for preparing a Faraday rotator is the liquid phase epitaxy, which comprises the steps of, for instance, mixing garnet components such as a combination of $Tb_4O_7$, $Bi_2O_3$ and $Fe_2O_3$ with flux components such as a combination of $B_2O_3$ and PbO, melting the resulting mixture in a platinum crucible, and immersing a paramagnetic garnet crystalline substrate in the molten mixture while maintaining the temperature of the melt constant and rotating the substrate to thus grow the foregoing desired crystal on the substrate. The lattice constant of the paramagnetic garnet substrate is 12.472±0.013 Å and therefore, it is possible to use a substituted crystalline substrate obtained by the substitution of a gadolinium-gallium-garnet crystal with Ca and/or Zr through addition thereof.

According to a third aspect of the present invention, there is provided a Faraday rotator, which consists of a garnet crystal represented by the following compositional formula II and having a lattice constant of 12.470±0.013 Å:

$$(Tb_{1-(a+b+c+e)}Ln_aBi_bM1_cEu_e)_3(Fe_{1-d}M2_d)_5O_{12} \quad \text{II}$$

In Formula II, Ln represents an element selected from the group consisting of rare earth elements other than Tb and Eu; M1 represents an element selected from the group consisting of Ca, Mg and Sr; M2 is an element selected from the group consisting of Al, Ti, Si and Ge; and a to e are numerals satisfying the following relations: $0 \leq a \leq 0.5$, $0 < b \leq 0.2$, $0 \leq c \leq 0.02$, $0 \leq d \leq 0.1$ and $0 < e \leq 0.3$.

The Faraday rotator according to the third aspect of the present invention is identical to the rotator according to the first aspect of the present invention except that a part of Tb present in the garnet crystal is substituted with Eu. In these Faraday rotators, the Faraday's rotational angle varies as a quadratic curve with respect to the temperature, but Eu serves to control the temperature at which the quadratic curve has a peak. Thus, the peak temperature of the Faraday's rotational angle can be controlled to a desired value (such as room temperature) by adjusting the e value to a level of not more than 0.3. In addition, Eu has an effect of inhibiting light absorption to thus improve the optical transmission of the rotator, like Ca, Mg and Sr. Therefore, if Eu is incorporated into the crystal to control the peak temperature of the Faraday's rotational angle, the rate c of Ca, Mg and Sr represented by M1 can be reduced in proportion thereto.

As specific examples of garnet crystals represented by Formula II, preferred be crystals represented by the following compositional formulas: $Tb_{2.42}Eu_{0.06}Bi_{0.52}Fe_5O_{12}$ and $Tb_{2.42}Eu_{0.06}Bi_{0.52}Fe_{4.95}Al_{0.05}O_{12}$.

The method for preparing a Faraday rotator according to a fourth aspect of the present invention comprises the step of growing a garnet crystal represented by Formula II and having a lattice constant of 12.470±0.013 Å on a substituted or unsubstituted gadolinium-gallium-garnet crystalline substrate having a lattice constant of 12.472±0.013 Å according to the liquid phase epitaxy.

A method for preparing this Faraday rotator is identical to that for preparing a Faraday rotator consisting of the garnet crystal represented by the foregoing Formula I except that $Eu_2O_3$ as a raw material is incorporated into the crystal.

A magneto-optical element according to a fifth aspect of the present invention is one selected from the group consisting of an optical isolator, an optical circulator, an optical switch, a magnetic field sensor and an optical attenuator and is characterized by comprising, as a component, the Faraday rotator according to the first or third aspect of the present invention.

A sixth aspect of the present invention relates to an optical isolator among the magneto-optical elements and comprises a polarizer and an analyzer whose planes of polarization are rotated with respect to each other at an angle of 90° and the Faraday rotator according to the first or third aspect of the present invention arranged between the polarizer and the analyzer.

A seventh aspect of the present invention relates to a preferred embodiment of the sixth aspect of the present invention and is characterized in that the Faraday's rotational angle of the Faraday rotator falls within the range of 36 to 44°.

Incidentally, these optical isolators each comprises a polarizer, a Faraday rotator and an analyzer which are arranged in this order as well as a magnetic body surrounding the Faraday rotator. They may be in the form of a single-step or multi-step type one. The polarizer and the analyzer have the same configuration and may be, for instance, a glass polarizing plate or a dielectric metal laminated film polarizer. Alternatively, an optical member such as a wavelength plate may be inserted into the isolator in addition to these components.

In the structure of the garnet crystal constituting the Faraday rotator according to the present invention, Bi ions and Tb ions as well as Eu ions are introduced into the 24c positions of the crystal. Thus, the Faraday's rotational angle varies as a quadratic function of temperature as the temperature of the use environment varies and the temperature at which the Faraday's rotational angle undergoing variation as a quadratic function of temperature has a peak can be controlled to a desired level by adjusting the amount of Eu to be incorporated into the crystal. For this reason, if the Faraday's rotational angle is controlled in such a manner that the low temperature-dependent region thereof is located at a temperature in common use such as room temperature, the Faraday rotator of the present invention would provide a stable Faraday's rotational angle even if the temperature of the use environment varies.

The method for preparing the Faraday rotator according to the present invention comprises the step of growing a garnet crystal having a lattice constant of 12.470±0.013 Å and is characterized in that a substituted or unsubstituted gadolinium-gallium-garnet crystal having a lattice constant of 12.472±0.013 Å is used as a crystalline substrate for liquid phase epitaxial growth. Accordingly, the resulting epitaxial crystalline layer is not susceptible to any crack because of high degree of crystal matching between the grown crystal and the crystalline substrate. Therefore, the Faraday rotator of the present invention can efficiently be produced in large quantities.

On the other hand, the magneto-optical element according to the present invention makes use of the Faraday rotator of the present invention whose Faraday's rotational angle is less dependent on the temperature as a component of the element and therefore, it can provide stable magneto-optical characteristics even if it is used in an environment which undergoes a temperature change.

Moreover, the optical isolator of the present invention, which makes use of the Faraday rotator according to the present invention would provide a stable extinction ratio even if it is used in an environment whose temperature varies.

Furthermore, in the optical isolator of the present invention, the Faraday's rotational angle of the Faraday rotator of the present invention, which is incorporated therein, is controlled to the range of from 36 to 44 deg. Therefore, the plane of polarization of the polarized light rays which can transmit through the polarizer and the analyzer or can be cut off by these elements is not consistent with or perpendicular to the direction of the plane of polarization of the polarizer and the analyzer. For this reason, the extinction ratio and the insertion loss of the resulting optical isolator are deteriorated to some extent. However, the change in the Faraday's rotational angle with temperature is considerably reduced as compared with that expected when the Faraday's rotational angle is set at 45° and therefore, the variation of the extinction ratio within the same temperature range is also greatly reduced. The use of the Faraday's rotational angle of less than 36° is not preferred, since the deterioration of the insertion loss of the resulting optical isolator is equal to 1 dB.

DETAILED EXPLANATION OF THE INVENTION

Examples of the present invention will hereunder be described in more detail. The following Examples 1 to 6 relate to embodiments according to the present invention and Comparative Examples 1 and 2 relate to embodiments, which are beyond the scope of the present invention.

EXAMPLE 1

There were weighed out, as raw materials, 23.1 g of $Tb_4O_7$, 929 g of $Bi_2O_3$, 188 g of $Fe_2O_3$, 79.6 g of $B_2O_3$, and 1780 g of PbO, followed by introducing these raw materials into a platinum crucible, melting them by heating to a temperature of 1040° C., maintaining the resulting melt at 790° C. and immersing, in the melt, an SOG substrate (the trade name of a crystalline substrate of gadolinium-gallium-garnet to which Ca and Zr were added for substitution, available from Shin-Etsu Chemical Co., Ltd.; lattice constant: 12.472±0.013 Å) having a diameter of 25 mmϕ and a thickness of 1.2 mm, while rotating the substrate to thus grow an epitaxial film thereon. As a result, a crystal body was deposited on the both sides of the substrate in a thickness of about 0.64 mm and there was not observed any formation of cracks. The resulting crystal body was subjected to high temperature emission spectro-chemical analysis (ICP) and as a result, it was found that the compositional formula thereof was $Tb_{2.41}Bi_{0.59}Fe_5O_{12}$. The lattice constant thereof was determined by the Bond method and found to be 12.481 Å.

The SOG substrate carrying a crystal body laminated with and deposited thereon was cut at the center thereof along the face of the plate, followed by removal of the residue of the SOG substrate adhered to the crystal body through polishing. The crystal body was polished into a piece of 2 mm square and having a thickness of 0.55 mm, while the face and back thereof were finished to optical planes by the mirror-finish processing and a bi-layered anti-reflection coating consisting of $SiO_2$ and $Al_2O_3$ was applied onto the optical planes to thus complete a Faraday rotator.

Figure 1:
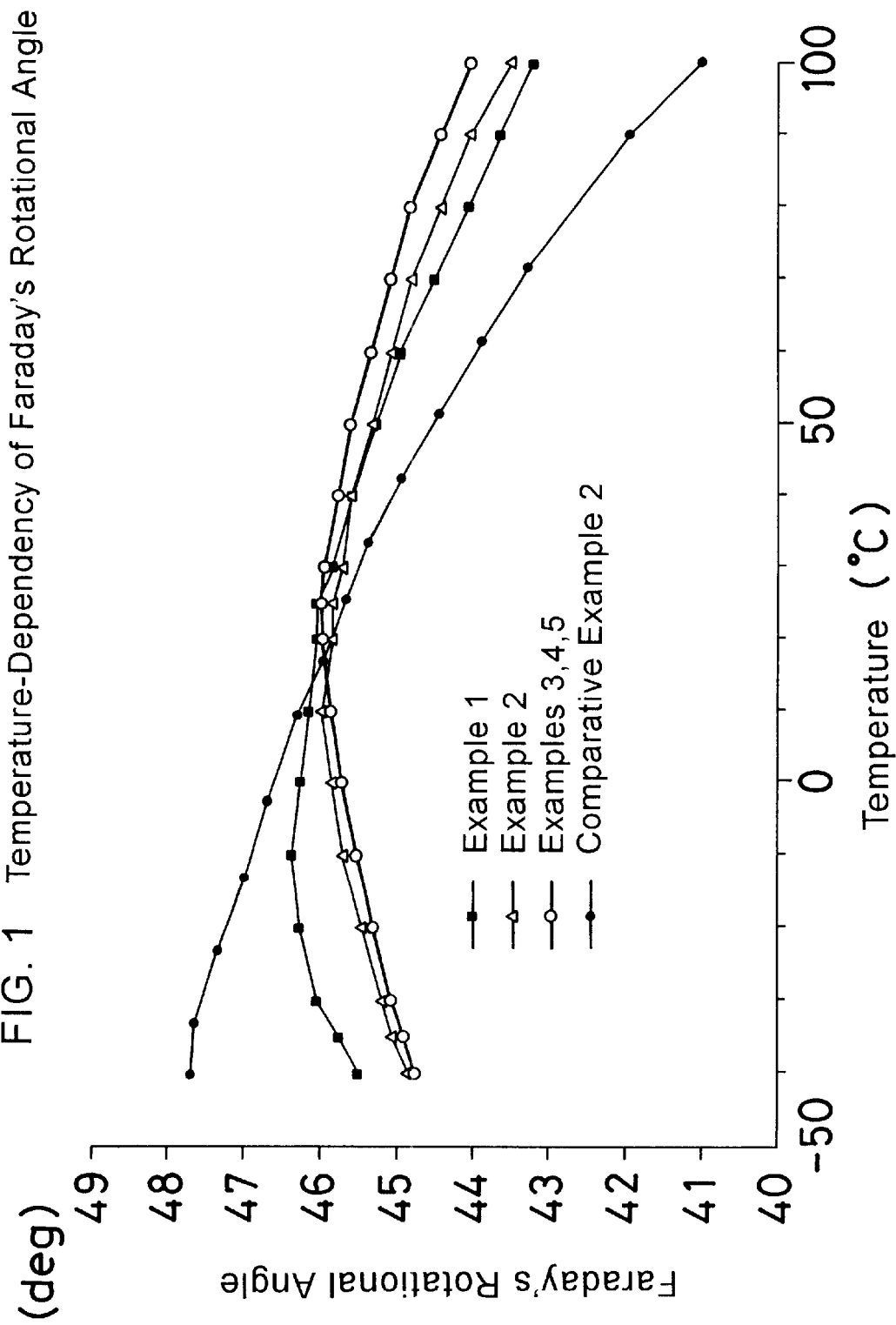
FIG. 1 is a graph showing temperature-dependency of Faraday's rotational angles of Faraday rotators manufactured by way of experiment in Examples and Comparative Examples.

A magnetic field of 1000 Oe was applied to the resulting Faraday rotator in a thermostatic chamber, while passing linearly polarized light rays having a wave length of 1310 nm through the rotator to thus determine the rotational angle (Faraday's rotational angle) of the plane of polarization of the transmitted light, using a Faraday's rotational angle-measuring device. The Faraday's rotational angle of the rotator was found to be 45.9° when the temperature of the thermostatic chamber was set at 20° C. FIG. 1 shows variations of the Faraday's rotational angle of the rotator thus determined, while variously changing the temperature of the thermostatic chamber. As will be seen from the results shown in FIG. 1, the temperature at which the Faraday's rotational angle of the rotator falls within the range: 45±1.0° ranges from 20 to 80° C.

Figure 2:
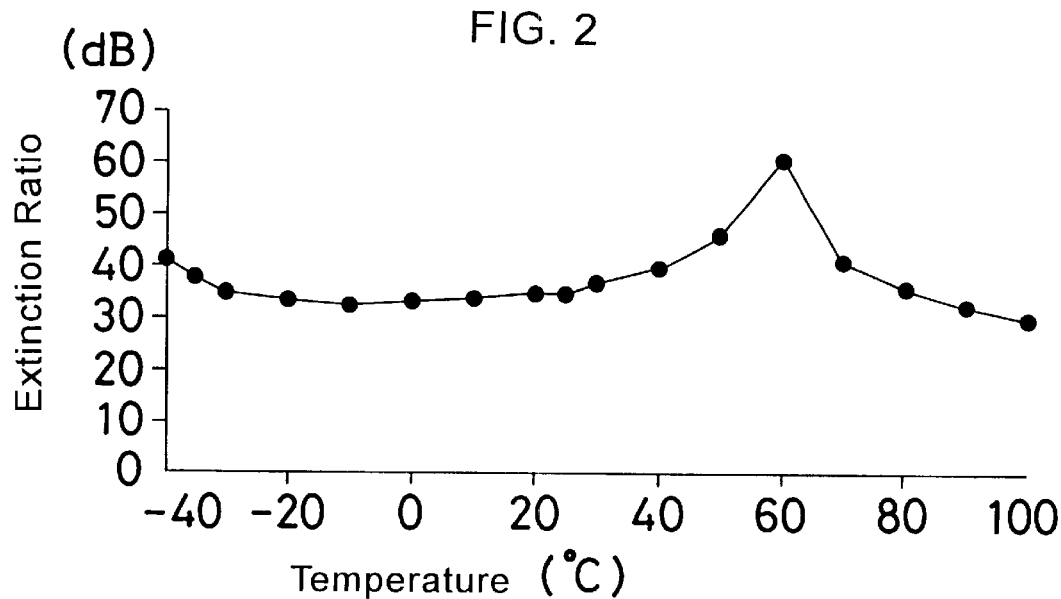
FIG. 2 is a graph showing temperature-dependency of extinction ratios of optical isolators made in Example 1 on a trial basis.

An optical isolator was manufactured, by way of experiment, by combining the Faraday rotator with a polarizer and an analyzer, both consisting of a glass polarizing plate. A magnetic field having the same intensity used above was applied to the Faraday rotator and light rays were passed therethrough, while variously changing the temperature of the thermostatic chamber. The extinction ratio was calculated as an extinction ability, i.e., a transmission-inhibitory effect of the optical isolator observed when light rays (incident light) once transmitted through the isolator and then reflected back to the isolator. FIG. 2 shows the relation between the measurement temperatures and the corresponding extinction ratios.

The extinction ratio and the insertion loss of the optical isolator as determined using light rays having a wavelength of 1310 nm at 25° C. were found to be 36 dB and 0.2 dB, respectively. The extinction ratio for the returned light rays must in general be not less than 35 dB. As will likewise be seen from the data shown in FIG. 2, the temperature at which the extinction ratio is not less than 35 dB is very wide and ranges from 20 to 80° C.

EXAMPLE 2

An epitaxial crystal body was produced by repeating the same procedures used in Example 1 except that the rate of Bi present in the raw materials was reduced. The compositional formula thereof was found to be $Tb_{2.49}Bi_{0.51}Fe_5O_{12}$ and the crystal body was deposited on an SOG substrate in a thickness of 0.73 mm. There was not observed any crack on the crystal body. The lattice constant thereof was found to be 12.477 Å. The resulting product was subjected to mirror-finish processing by scraping the SOG substrate to thus give a crystal body having a thickness of 0.66 mm.

A Faraday rotator was manufactured, by way of experiment, by subjecting the resulting crystal body to the same coating treatment used in Example 1. The Faraday rotator was subjected to the same measurements carried out in Example 1. The results thus obtained are shown in FIG. 1. The Faraday rotator was found to have a Faraday's rotational angle as determined at 20° C. of 45.8 deg. and the temperature at which the Faraday's rotational angles fell within the range: 45±1.0 deg. ranging from −40 to 90° C. The Faraday's rotational angle varies as a quadratic function of temperature. The temperature at which the quadratic curve of the Faraday's rotational angle had a peak was found to be 15° C.

Figure 3:
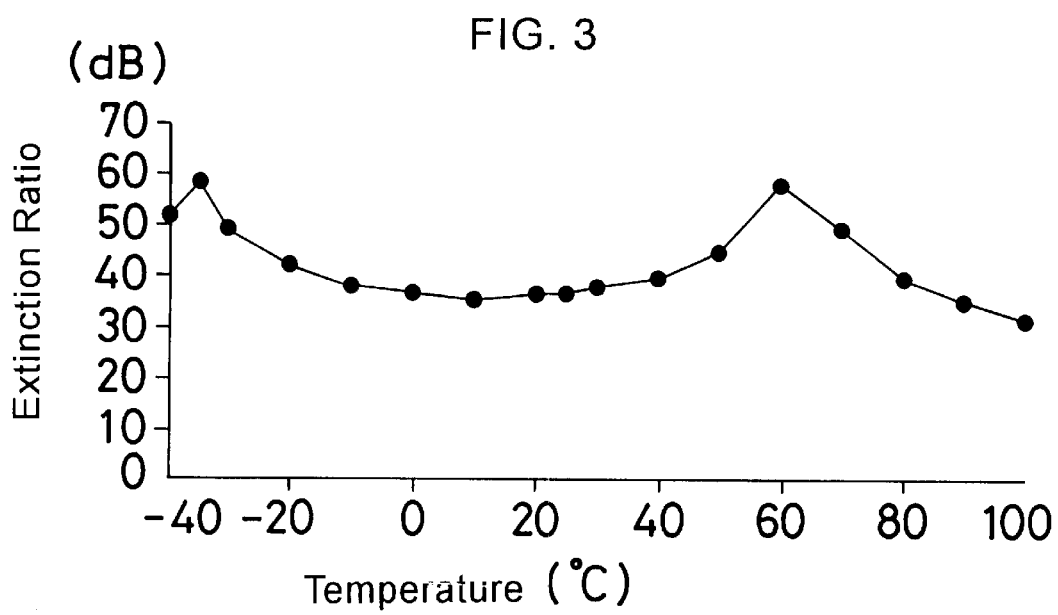
FIG. 3 is a graph showing temperature-dependency of extinction ratios of optical isolators made in Example 2 on a trial basis.

Moreover, an optical isolator was produced using the Faraday rotator by repeating the same procedures used in Example 1, by way of experiment. The same measurements performed in Example 1 were carried out using the resulting optical isolator. The results thus obtained are plotted on FIG. 3. The extinction ratio and the insertion loss of the optical isolator as determined using light rays having a wavelength of 1310 nm at 25° C. were found to be 36 dB and 0.2 dB, respectively. The temperature at which the extinction ratio is not less than 35 dB is very wide and ranges from −40 to 90° C.

EXAMPLE 3

An epitaxial crystal body was produced by repeating the same procedures used in Example 1 except that $Eu_2O_3$ was added to the raw materials. The compositional formula thereof was found to be $Tb_{2.49}Eu_{0.06}Bi_{0.45}Fe_5O_{12}$ and the crystal body was deposited on an SOG substrate in a thickness of 0.74 mm. There was not observed any crack on the crystal body. The lattice constant thereof was found to be 12.477 Å. The resulting product was subjected to mirror-finish processing by scraping the SOG substrate to thus give a crystal body having a thickness of 0.67 mm.

A Faraday rotator was manufactured, by way of experiment, by subjecting the resulting crystal body to the same coating treatment used in Example 1. The Faraday rotator was subjected to the same measurements carried out in Example 1. The results thus obtained are shown in FIG. 1. The Faraday rotator was found to have a Faraday's rotational angle as determined at 20° C. of 45.8 deg. and a very wide temperature range within which the Faraday's rotational angles fell within the range: 45±1.0 deg., ranging from −40 to 100° C. The Faraday's rotational angle varies as a quadratic function of temperature. The temperature at which the quadratic curve of the Faraday's rotational angle had a peak was found to be 30° C.

Figure 4:
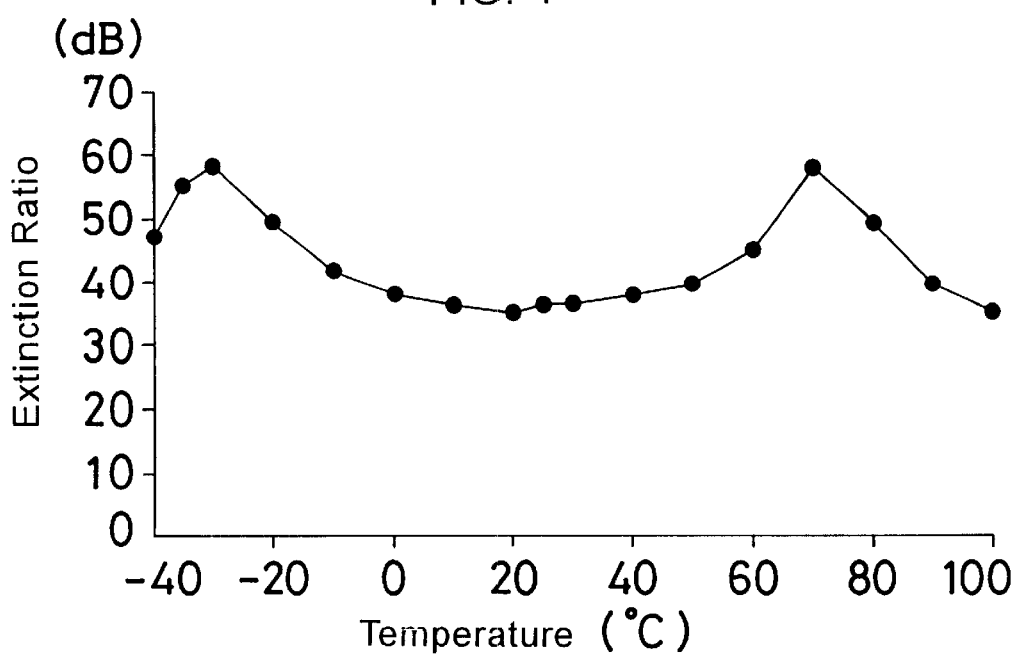
FIG. 4 is a graph showing temperature-dependency of extinction ratios of optical isolators made in Example 3 on a trial basis.

Moreover, an optical isolator was produced using the Faraday rotator by repeating the same procedures used in Example 1, by way of experiment. The same measurements performed in Example 1 were carried out using the resulting optical isolator. The results thus obtained are plotted on FIG. 4. The extinction ratio and the insertion loss of the optical isolator as determined using light rays having a wavelength of 1310 nm at 25° C. were found to be 36 dB and 0.14 dB, respectively. The temperature at which the extinction ratio is not less than 35 dB is very wide and ranges from −40 to 100° C.

EXAMPLE 4

An epitaxial crystal body was produced by repeating the same procedures used in Example 3 except that a small amount of $Al_2O_3$ was added to the raw materials. The compositional formula thereof was found to be $Tb_{2.49}Eu_{0.06}Bi_{0.45}Fe_{4.95}Al_{0.05}O_{12}$ and the crystal body was deposited on an SOG substrate in a thickness of 0.74 mm. There was not observed any crack on the crystal body. The lattice constant thereof was found to be 12.476 Å. The resulting product was subjected to mirror-finish processing by scraping the SOG substrate to thus give a crystal body having a thickness of 0.67 mm.

A Faraday rotator was manufactured, by way of experiment, by subjecting the resulting crystal body to the same coating treatment used in Example 1. The Faraday rotator was subjected to the same measurements carried out in Example 1. The results thus obtained are shown in FIG. 1. The Faraday rotator was found to have a Faraday's rotational angle as determined at 20° C. of 45.8 deg. and a temperature range within which the Faraday's rotational angles fell within the range: 45±1.0 deg., ranging from −40 to 100° C. The Faraday's rotational angle varies as a quadratic function of temperature. The temperature at which the quadratic curve of the Faraday's rotational angle had a peak was found to be 25° C.

Moreover, an optical isolator was produced using the Faraday rotator by repeating the same procedures used in Example 1, by way of experiment. The same measurements carried out in Example 1 were performed using the resulting optical isolator. The results thus obtained are plotted on FIG. 4. The extinction ratio and the insertion loss of the optical isolator as determined using light rays having a wavelength of 1310 nm at 25° C. were found to be 36 dB and 0.14 dB, respectively. The temperature at which the extinction ratio is not less than 35 dB is very wide and ranges from −40 to 100° C.

EXAMPLE 5

An epitaxial crystal body was prepared using the same raw materials used in Example 3. The resulting crystal body had a compositional formula identical to that established for the crystal body prepared in Example 3, but the lattice constant was slightly larger than that observed in Example 3 and on the order of 12.478 Å. The crystal body was formed into a Faraday rotator having a thickness of 0.66 mm. The Faraday's rotational angle of this rotator as determined at 20° C. was found to be 40.0 deg.

Moreover, an optical isolator was produced using the Faraday rotator by repeating the same procedures used in Example 1, by way of experiment. The same measurements carried out in Example 1 were performed using the resulting optical isolator and it was found that the extinction ratio and the insertion loss of the optical isolator as determined using light rays having a wavelength of 1310 nm at 25° C. were found to be 38 dB and 0.34 dB, respectively. The temperature at which the extinction ratio is not less than 37 dB is very wide and ranges from −40 to 100° C.

EXAMPLE 6

An epitaxial crystal body was produced by repeating the same procedures used in Example 3 except that a small amount of $Al_2O_3$ was added to the raw materials. The compositional formula thereof was found to be $Tb_{2.49}Eu_{0.16}Bi_{0.35}Fe_{4.95}Al_{0.05}O_{12}$. There was not observed any crack on the crystal body. The lattice constant thereof was found to be 12.471 Å. The resulting product was subjected to mirror-finish processing by scraping the SOG substrate to thus give a crystal body having a thickness of 0.84 mm and a Faraday rotator was formed from the crystal body. The Faraday rotator was subjected to the same measurements carried out in Example 1. The results thus obtained are shown in FIG. 1. The Faraday rotator was found to have a Faraday's rotational angle observed at 20° C. for light rays of 1550 nm of 45.8 deg. and a temperature range within which the Faraday's rotational angles fell within the range: 45±1.0 deg., ranging from −40 to 100° C. The Faraday's rotational angle varies as a quadratic function of temperature. The temperature at which the quadratic curve of the Faraday's rotational angle had a peak was found to be 25° C.

Moreover, an optical isolator was produced using the Faraday rotator by repeating the same procedures used in Example 1, by way of experiment. The same measurements carried out in Example 1 were performed using the resulting optical isolator and it was found that the extinction ratio and the insertion loss of the optical isolator as determined using light rays having a wavelength of 1550 nm at 25° C. were found to be 36 dB and 0.24 dB, respectively. The temperature at which the extinction ratio is not less than 35 dB is very wide and ranges from −40 to 100° C.

Comparative Example 1

The same procedures used in Example 1 were repeated except for using, as raw materials, 20.59 g of $Tb_4O_7$, 1451 g of $Bi_2O_3$, 170.7 g of $Fe_2O_3$, 5.0 g of $Ga_2O_3$, 18.58 g of $B_2O_3$ and 8340 g of PbO; and an SGG substrate (a samarium-gallium-garnet represented by $Sm_3Ga_5O_{12}$) having a diameter of 25 mmφ, a thickness of 1.4 mm and a lattice constant of 12.439 Å as a crystalline substrate to thus try the epitaxial growth of a crystal. As a result, it was found that when an epitaxial layer having a thickness of 0.6 mm was deposited on the SOG substrate, the layer underwent cracking and accordingly, any crystal body having a thickness sufficient for preparing a Faraday rotator was not obtained at all. The compositional formula of the crystal body was found to be $Tb_{2.60}Bi_{0.40}Fe_{4.88}Ga_{0.12}O_{12}$.

Comparative Example 2

The same procedures used in Example 1 were repeated except for using, as raw materials, 26.56 g of $Tb_4O_7$, 2.84 g of $Eu_2O_3$, 1205 g of $Bi_2O_3$, 193.24 g of $Fe_2O_3$, 6.48 g of $Ga_2O_3$, 27.0 g of $B_2O_3$, and 1038.93 g of PbO; and an NOG substrate (trade name of a substrate obtained by adding at least one Ca, Mg, Zr, Y to gadolinium-gallium-garnet for substitution, available from Shin-Etsu Chemical Co., Ltd.) having a diameter of 25 mmφ, a thickness of 1.4 mm and a lattice constant of 12.496 Å as a crystalline substrate to thus give an epitaxial crystal body. The compositional formula of the crystal body was found to be $Tb_{1.97}Eu_{0.21}Bi_{0.82}Fe_{4.71}Ga_{0.29}O_{12}$ and the crystal body was deposited on the NOG substrate in a thickness of 0.73 mm. There was not observed any cracking. In addition, the lattice constant was found to be 12.492 Å. The resulting product was subjected to mirror-finish processing by scraping the NOG substrate to thus give a crystal body having a thickness of 0.42 mm.

A Faraday rotator was manufactured, by way of experiment, by subjecting the resulting crystal body to the same coating treatment used in Example 1. The Faraday rotator was subjected to the same measurements carried out in Example 1. The results thus obtained are shown in FIG. 1. The Faraday rotator was found to have a Faraday's rotational angle as determined at 20° C. of 45.0 deg. and the temperature at which the Faraday's rotational angles fell within the range: 45±1.0 deg. ranging from 0 to 50° C.

Moreover, an optical isolator was produced using the Faraday rotator by repeating the same procedures used in Example 1, by way of experiment. The same measurements performed in Example 1 were carried out using the resulting optical isolator and it was found that the extinction ratio and the insertion loss of the optical isolator as determined using light rays having a wavelength of 1310 nm at 25° C. were found to be 36 dB and 0.22 dB, respectively. The temperature at which the extinction ratio is not less than 35 dB is very narrow and ranges from 0 to 50° C.

As has been described above in detail, according to the Faraday rotator of the present invention, the region in which the Faraday's rotational angle is less susceptible to the temperature can be controlled in such a manner that the region falls within the range commonly used. Therefore, a stable Faraday's rotational angle can be ensured even if the temperature of the use environment varies. Moreover, in the method for preparing the Faraday rotator according to the present invention, the crystal to be used for forming a Faraday rotator and grown by the liquid phase epitaxy shows good matching properties with a crystalline substrate serving as a seed crystal and therefore, the epitaxially grown crystal body never causes any cracking. Consequently, the method of the present invention permits the highly efficient mass-production of the Faraday rotator of the present invention.

In addition, the magneto-optical element according to the present invention would provide stable magneto-optical properties even when it is used in an environment, which undergoes temperature changes, since it uses, as a component, the Faraday rotator of the present invention, whose Faraday's rotational angle has low temperature-dependency. Further the optical isolator of the present invention, which makes use of the Faraday rotator according to the present invention can provide a stable extinction ratio even when it is used in an environment which undergoes temperature changes.

What is claimed is:

1. A Faraday rotator comprising a garnet crystal represented by the following compositional formula and having a lattice constant of 12.470±0.013 Å:

$$(Tb_{1-(a+b+c)}Ln_aBi_bM1_c)_3(Fe_{1-d}M2_d)_5O_{12}$$

in the formula, Ln is an element selected from the group consisting of rare earth elements other than Tb; M1 represents an element selected from the group consisting of Ca, Mg and Sr; M2 is an element selected from the group consisting of Al, Ti, Si and Ge; and a to d are numerals satisfying the following relations: $0 \leq a \leq 0.5$, $0 < b \leq 0.2$, $0 \leq c \leq 0.02$ and $0 \leq d \leq 0.1$.

2. A method for preparing a Faraday rotator comprising the step of growing a garnet crystal represented by the following formula and having a lattice constant of 12.470±0.013 Å:

$$(Tb_{1-(a+b+c)}Ln_aBi_bM1_c)_3(Fe_{1-d}M2_d)_5O_{12}$$

in the formula, Ln is an element selected from the group consisting of rare earth elements other than Tb; M1 represents an element selected from the group consisting of Ca, Mg and Sr; M2 is an element selected from the group consisting of Al, Ti, Si and Ge; and a to d are numerals satisfying the following relations: $0 \leq a \leq 0.5$, $0 < b \leq 0.2$, $0 \leq c \leq 0.02$ and $0 \leq d \leq 0.1$, on a substituted or unsubstituted gadolinium-gallium-garnet crystalline substrate having a lattice constant of 12.472±0.013 Å according to the liquid phase epitaxy.

3. A Faraday rotator consisting of a garnet crystal represented by the following compositional formula and having a lattice constant of 12.470±0.013 Å:

$$(Tb_{1-(a+b+c+e)}Ln_aBi_bM1_cEu_e)_3(Fe_{1-d}M2_d)_5O_{12}$$

in the formula, Ln represents an element selected from the group consisting of rare earth elements other than Tb and Eu; M1 represents an element selected from the group consisting of Ca, Mg and Sr; M2 is an element selected from the group consisting of Al, Ti, Si and Ge; and a to e are numerals satisfying the following relations: $0 \leq a \leq 0.5$, $0 < b \leq 0.2$, $0 \leq c \leq 0.02$, $0 \leq d \leq 0.1$ and $0 < e \leq 0.3$.

4. A method for preparing a Faraday rotor comprising the step of growing a garnet crystal represented by the following formula and having a lattice constant of 12.470±0.013 Å:

$$(Tb_{1-(a+b+c+e)}Ln_aBi_bM1_cEu_e)_3(Fe_{1-d}M2_d)_5O_{12}$$

in the formula, Ln represents an element selected from the group consisting of rare earth elements other than Tb and Eu; M1 represents an element selected from the group consisting of Ca, Mg and Sr; M2 is an element selected from the group consisting of Al, Ti, Si and Ge; and a to e are numerals satisfying the following relations: $0 \leq a \leq 0.5$, $0 < b \leq 0.2$, $0 \leq c \leq 0.02$, $0 \leq d \leq 0.1$ and $0 < e \leq 0.3$, on a substituted or unsubstituted gadolinium-gallium-garnet crystalline substrate having a lattice constant of 12.472±0.013 Å according to the liquid phase epitaxy.

5. A magneto-optical element selected from the group consisting of an optical isolator, an optical circulator, an optical switch, a magnetic field sensor and an optical attenuator and comprising, as a component, the Faraday rotator as set forth in claim 1.

6. An optical isolator comprising a polarizer and an analyzer, which are arranged in such a manner that the planes of polarization are rotated relative to one another at an angle of 90 deg. and the Faraday rotator as set forth in claim 1 positioned between the polarizer and the analyzer.

7. The optical isolator as set forth in claim 6 wherein the Faraday's rotational angle of the Faraday rotator ranges from 36 to 44 deg.

8. A magneto-optical element selected from the group consisting of an optical isolator, an optical circulator, and optical switch, a magnetic field sensor and an optical attenuator and comprising, as a component, the Faraday rotator as set forth in claim 3.

9. An optical isolator comprising a polarizer and an analyzer, which are arranged in such a manner that the planes of polarization are rotated relative to one another at an angle of 90 degrees, and the Faraday rotator as set forth in claim 3 position between the polarizer and the analyzer.

* * * * *